United States Patent
Titus

(10) Patent No.: US 7,097,458 B2
(45) Date of Patent: Aug. 29, 2006

(54) WORD KEY

(76) Inventor: Peter F. Titus, 2277 Tilbrook Rd., Monroeville, PA (US) 15146

(*) Notice: Subject to any disclaimer, the term of this patent is extended or adjusted under 35 U.S.C. 154(b) by 219 days.

(21) Appl. No.: 10/611,705

(22) Filed: Jul. 1, 2003

(65) Prior Publication Data

US 2005/0003334 A1    Jan. 6, 2005

(51) Int. Cl.
G09B 17/00 (2006.01)

(52) U.S. Cl. ..................... 434/178

(58) Field of Classification Search ............... 434/156, 434/157, 167, 178
See application file for complete search history.

(56) References Cited

U.S. PATENT DOCUMENTS

| | | | | |
|---|---|---|---|---|
| 3,242,596 A | * | 3/1966 | Smith | 434/349 |
| 4,544,360 A | * | 10/1985 | Goodman | 434/178 |
| 5,365,434 A | * | 11/1994 | Figliuzzi | 715/501.1 |
| 5,408,950 A | * | 4/1995 | Porto | 116/239 |
| 5,414,946 A | * | 5/1995 | Leon | 40/353 |
| 5,558,520 A | * | 9/1996 | Werzberger | 434/317 |
| 5,856,661 A | * | 1/1999 | Finkelstein et al. | 235/487 |
| 5,934,708 A | * | 8/1999 | Batjuk | 283/46 |
| 6,024,571 A | * | 2/2000 | Renegar | 434/157 |
| 6,402,522 B1 | * | 6/2002 | Gabay et al. | 434/322 |
| 6,424,984 B1 | * | 7/2002 | Yao | 708/105 |
| 6,474,992 B1 | * | 11/2002 | Marshall | 434/167 |

* cited by examiner

Primary Examiner—Kurt Fernstrom
(74) Attorney, Agent, or Firm—James Ray & Assoc.

(57) ABSTRACT

An apparatus for marking a page in a predetermined book. The apparatus comprises a substrate having a predetermined size and a predetermined configuration and selected words disposed adjacent definitions of the selected words on at least one side of the substrate, the selected words being words that are used in such predetermined book which are likely to be unfamiliar to an average reader of such book for which the apparatus is to be used.

20 Claims, 5 Drawing Sheets

16" FURTIVE sly; secretive GESTICULATE move ones body (arms, hands, legs) while speaking to help express an idea or feeling HANSOM - a two wheel horse drawn carriage, that carries two passengers, with an elevated drivers seat behind the cab HOMELY without culture or refinement; unpolished; crude or rough in character HYPOTHESIS - a likely but unproven explanation that required further testing IMMACULATE completely clean; spotless IMMUTABLE - unchangeable; permanent IMPASSIVE emotionless; unmoved IMPLICIT without question, pause or conditions; complete and total IMPRUDENT unwise; thoughtless; foolish; careless INCESSANTLY - continually; repeatedly without interruption INCLEMENT - harsh; stormy INCREDULITY - doubt; disbelief INCREDULOUSLY in disbelief INDELIBLE - strong, firm; permanent; not movable INDIFFERENT without interest or concern; uncaring INFAMOUS well-known for ones unlawful or wrongful activities INFAMY - vileness; wickedness INFATUATED - holding someone in complete and foolish adoration; over come and guided by foolish and excessive passion; stripped of good judgment INFERENCE - a conclusion reached through reasoning INFERNAL fiendish; awful; terrible; outrageous INJUNCTION order; command INSCRUTABLE beyond understanding; baffling; incomprehensible INTERMINABLE endless IRRESOLUTION - hesitation; indecision; inability to make up one's mind LEADED refers to a method in printing by which the lines of type are spaced equally apart though the use of a thin strip of metal LEAGUE a distance of approximately three miles LEGACY - money or property left to someone in a will LINTEL - horizontal supporting beam above a door LOOPHOLE - a small opening in a fortress wall, used to shoot or look through LUMINOUS - bright; radiant; glowing MALIGNANCY evil, harmful or hateful intentions MALIGNANT 1) that which is very harmful or deadly 2) evil; hateful MANORIAL - concerning a manor (a large or landed estate) MASTIFF a very muscular large bodied breed of dog MEAN shabby; MELANCHOLY gloomy; dreary MENACING threatening; dangerous MIASMATIC - poisonous; noxious; injurious to one's health MIRE 1) deep mud 2) marsh; bog MIRY muddy MORASS - swamp; area of soft wet ground MOTTLED - marked with spots of different colors or shades MULLIONED - a window having thin vertical bars NARRATIVE story; account NATURALIST - one who studies things found in nature, most commonly plants and animals NOCTURNAL - done at night PANNIKIN 1) small pan 2) tin cup PALLID pale; bloodless PEREMPTORY - not permitting any refusal or delay PLACID - calm; peaceful PRECIPICE cliff PRECIPITOUS - very steep PRESUMPTION conduct that is extremely bold or forward PROFANE to treat sacred and holy thing with disregard, contempt or irreverence PROPITIOUS favorable PROSAIC - ordinary; commonplace; uninteresting; not exciting; dull PROSTRATE - lying flat; stretched out horizontally PUGNACIOUS - inclined to fight; quarrelsome; defiant; combative PURITANICAL very strict in morals or religion PURLOINED stolen; removed REPRESS - hold back; restrain REPROACH source of disapproval or discredit; stain REPROVE - blame; scold; find fault with RETICENT - tending to maintain silence and keep thoughts to oneself; secretive ROYSTERER - one who is loud and disorder and full of revelry RUEFUL sad; sorrowful SCION descendant SCULLERY a room off the kitchen where pots and utensils are washed and stored and where the grosser aspects of food preparation occur SERRATED - notched or toothed along the edge like a saw SETTEE - sofa; a wide seat with a back and arms SINISTER indicating evil or danger lies hidden waiting; alarming; threatening SKEIN - a small bundle of thread or yarn, wound on a reel or in a loose coil SLOVENLY - careless; lacks neatness SOLEMN earnest; sincere SOLICITATIONS requests; appeals; invitation SPECIOUS - seeming good reasonable, or valid, but not really so SPECTRAL - ghostly STEALTHILY slyly; secretly STEALTHY secretive SUPPLE flexible; bendable SURMISE - guess SURMOUNT to lie above or on top of TARIFF - a tax or duty placed by a government on goods imported into the country TEMPESTUOUS stormy; violent TOR - a high barren rocky hill TRACERY a decorative design formed by the crossing over and branching out of lines TRENCHER - a wooden plate upon which meat is sliced and served TWAIN two TYRANT a ruler or master who acts with cruelty, harshness and injustice UNDULATING going up and down; following a wave-like pattern UNMITIGATED complete; absolute UNWONTED rare; uncommon; unusual VENERABLE -1) old, wise and worthy or respect; honorable 2) dignified; of elevated rank or social position WANTON 1) heartless; with no regard for what is right or just 2) uncalled - for; lacking reason and justification; needless 3) lewd; immoral WORRY - to bite; to seize and tear a something with teeth YEW includes any evergreen trees or shrubs within the genus Taxus

FIG. 2

WORD KEY

FIELD OF THE INVENTION

The present invention relates, in general, to an aid for use in reading a predetermined book, particularly, the present invention relates to a book mark which contains usable definitions for difficult words in the context they appear in the predetermined book.

BACKGROUND OF THE INVENTION

Many times when a person reads a book there are at least several words in the book that the reader is unfamiliar with. Sometimes the meaning of these words can be gleaned by how the words are used in sentences. However, more often the reader needs to consult outside references, such as dictionaries, encyclopedias, etc. to gain an understanding of these words. Often these sources are not readily available and, thus, the reader may elect to forego such interruptions because they are time consuming and disruptive to the readers concentration.

Instead the reader may guess at the meaning of the word by its context in the sentence or paragraph. Incorrect guesses may lead to erroneous conclusions as to the meaning of the text that is being read. The frequency of misunderstanding by a reader increases with the complexity of the vocabulary used by the writer. Thus, it would be advantageous to a reader if the meaning of difficult or unusual words were made conveniently and easily accessible.

SUMMARY OF THE INVENTION

The present invention provides an apparatus for marking a page in a predetermined book. The apparatus comprises a substrate having a predetermined size and a predetermined configuration and selected words disposed adjacent definitions of the selected words on at least one side of the substrate, the selected words being words that are used in such predetermined book which are likely to be unfamiliar to an average reader of such book for which the apparatus is to be used.

OBJECTS OF THE INVENTION

It is, therefore, one of the primary objects of the present invention to provide a bookmark to be used with a predetermined book on which are provided useful definitions for difficult words that are used in the predetermined book.

Another object of the present invention is to provide a book mark that is easy for the reader to use.

Still another object of the present, invention is to provide a bookmark to be used with a predetermined book on which are provided useful synonyms for difficult words that are used in the predetermined book.

Yet another object of the present invention is to provide bookmarks for use with predetermined books which are provided with definitions for difficult words wherein each book in a series has its own bookmark.

Another object of the present invention is to provide a bookmark to be used with a predetermined book on which the difficult words that are used in the predetermined book that are defined are printed in alphabetical order.

In addition to the numerous objects and advantages of the present invention which have been described with some degree of particularity above, it should be both noted and understood that a number of other important objects and advantages of the invention will become more readily apparent to those persons who are skilled in the relevant art from the following more detailed description of the invention, particularly, when such detailed description is taken in conjunction with the appended claims.

BRIEF DESCRIPTION OF THE DRAWINGS

FIG. 2 is view of the back side of the apparatus for marking a page in a predetermined book.

Figure 1:
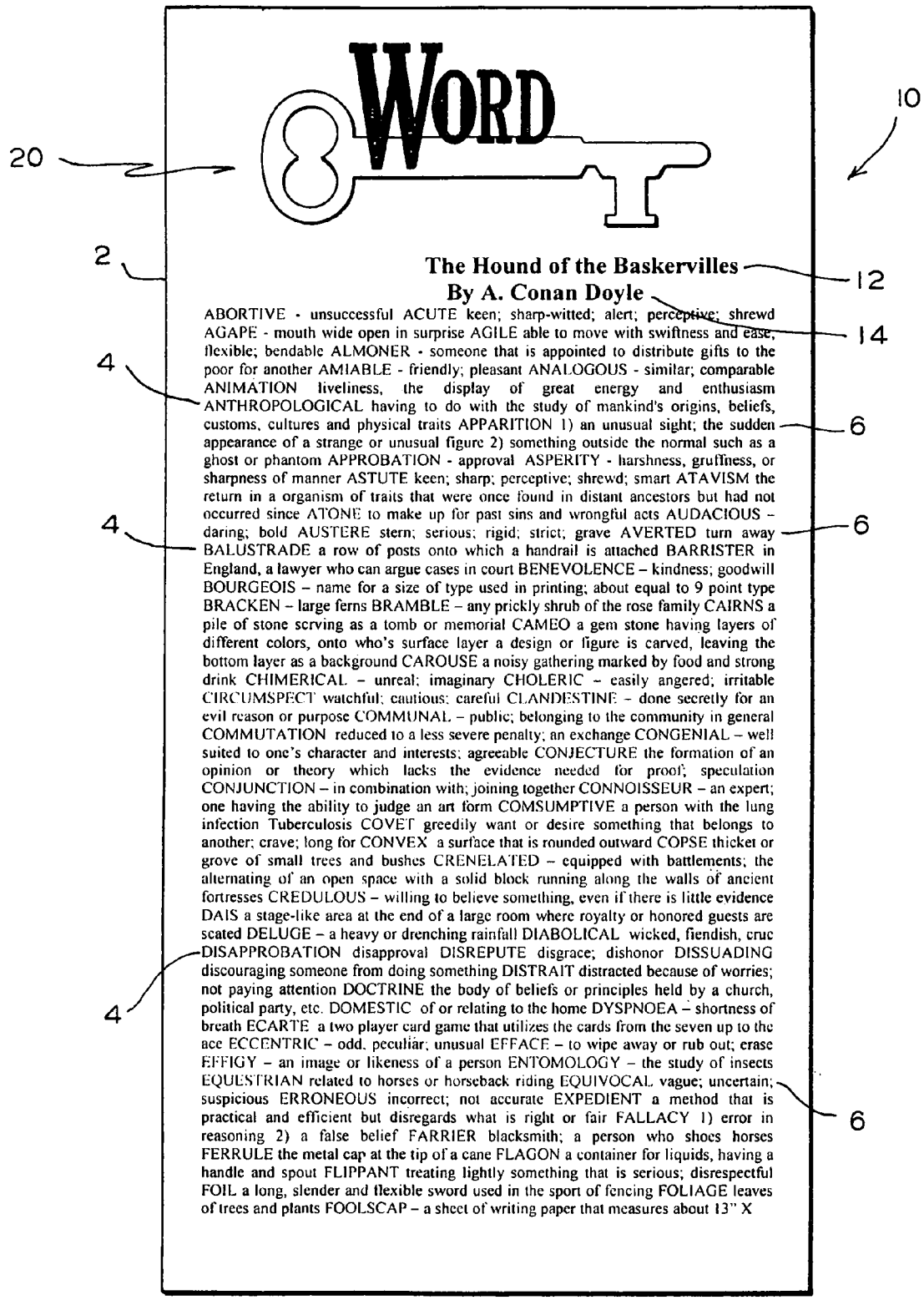
FIG. 1 is view of the front side of the apparatus for marking a page in a predetermined book.

BRIEF DESCRIPTION OF THE PRESENTLY PREFERRED AND VARIOUS ALTERNATE EMBODIMENTS OF THE PRESENT INVENTION

Prior to proceeding to the more detailed description of the present invention, it should be noted that for the sake of clarity in understanding the invention, identical components with identical functions have been designated with identical reference numerals throughout the drawing Figures.

Illustrated in FIGS. 1 and 2 is the present invention which provides an apparatus, generally designated 10, for marking a page in a predetermined book. The apparatus 10 is essentially a bookmark. The apparatus 10 includes a substrate 2 having a predetermined size and a predetermined configuration.

The substrate 2 has selected words 4 along with definitions 6 of the selected words 4 disposed on at least one side of the substrate. Word and words will be used interchangeably and both will be designated 4 in this disclosure. Also, in the context of the invention the word "definition" is used to include a statement of meaning, an explanation of the word within the context used in the book, a synonym for the word or a simple definition of the word. Also, all of the examples and the drawing figures are shown with the words and definitions in English. However, it is within the scope of the invention that such words and definitions could also be in different languages.

The selected words 4 being uncommon words 4 that are used in the predetermined book (not shown) for which the apparatus 10 is to be used. The book may be fiction or nonfiction. The definitions 6 may be simply a synonym of the word 2 which substantially defines the word 4 as it is used in the text of the predetermined book. The apparatus 10 is specific for that predetermined book. A different apparatus 10 is used for each predetermined book for which an apparatus 10 is designed.

The apparatus 10 would have a word key logo, generally designated 20, disposed on a first side of such apparatus 10. Beneath the word key logo 20 would be the title 12, followed by the author 14 of the predetermined book for which the apparatus 10 is designed. Beneath the author 14 would be the first word 4 followed by the definition 6 for that word 4. It is preferred that the words 4 with their respective definitions 6 are disposed in alphabetical sequence on the substrate 2. As stated previously, the definitions 6 may be single word synonyms or may define the word 4 in as few words as needed but generally the definition 6 will be concise. Further, the definition 6 will be in keeping with the context of how the word 4 is used in the text.

In one embodiment of the invention such words 4 are written in bold print so as to distinguish them from the definitions 6 which are written in standard print and thus make it easier for the user to find the word(s) 4 that the user is unsure of. It is within the scope of the invention that such words 4 and definitions 6 may be differentiated by the use of different colors rather than bold and standard print and it is also within the scope of the invention that various fonts or different layout formats may be used to fit special or artistic needs.

Figure 3:
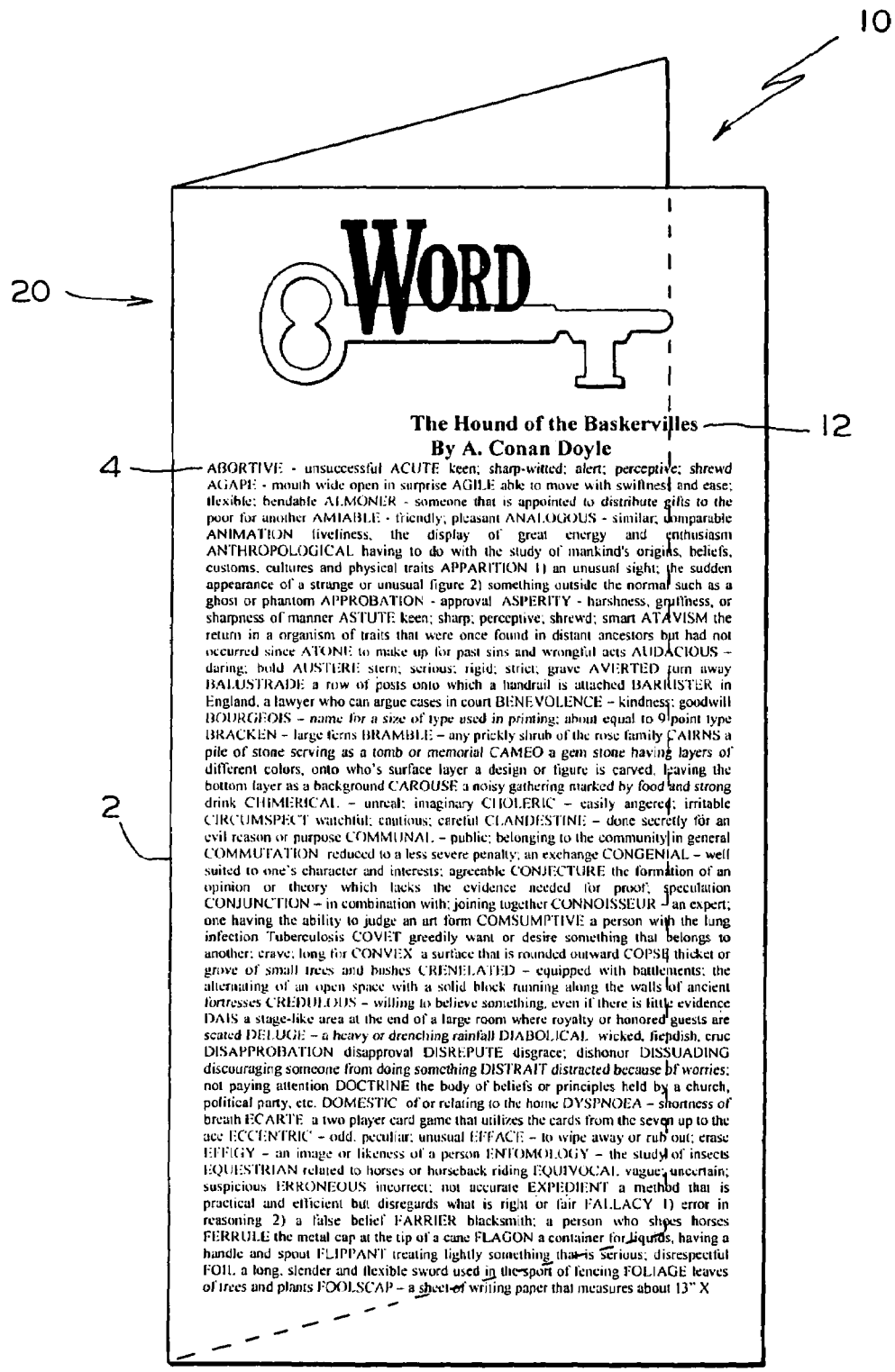
FIG. 3 is a partial perspective view of the apparatus in which the apparatus is folded once for use with smaller books.
Figure 4:
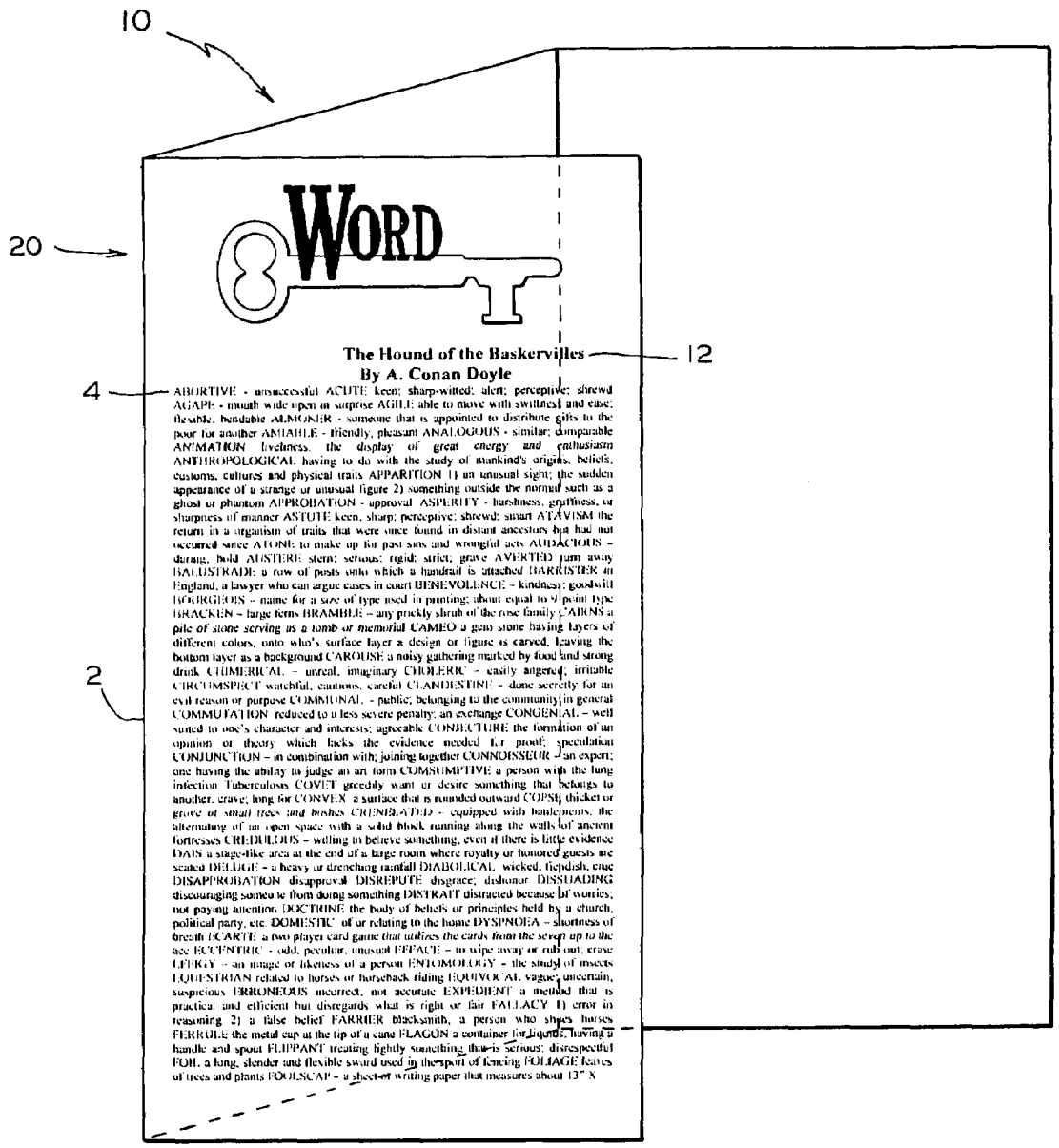
FIG. 4 is a partial perspective view of the apparatus in which the apparatus is folded twice.
Figure 5:
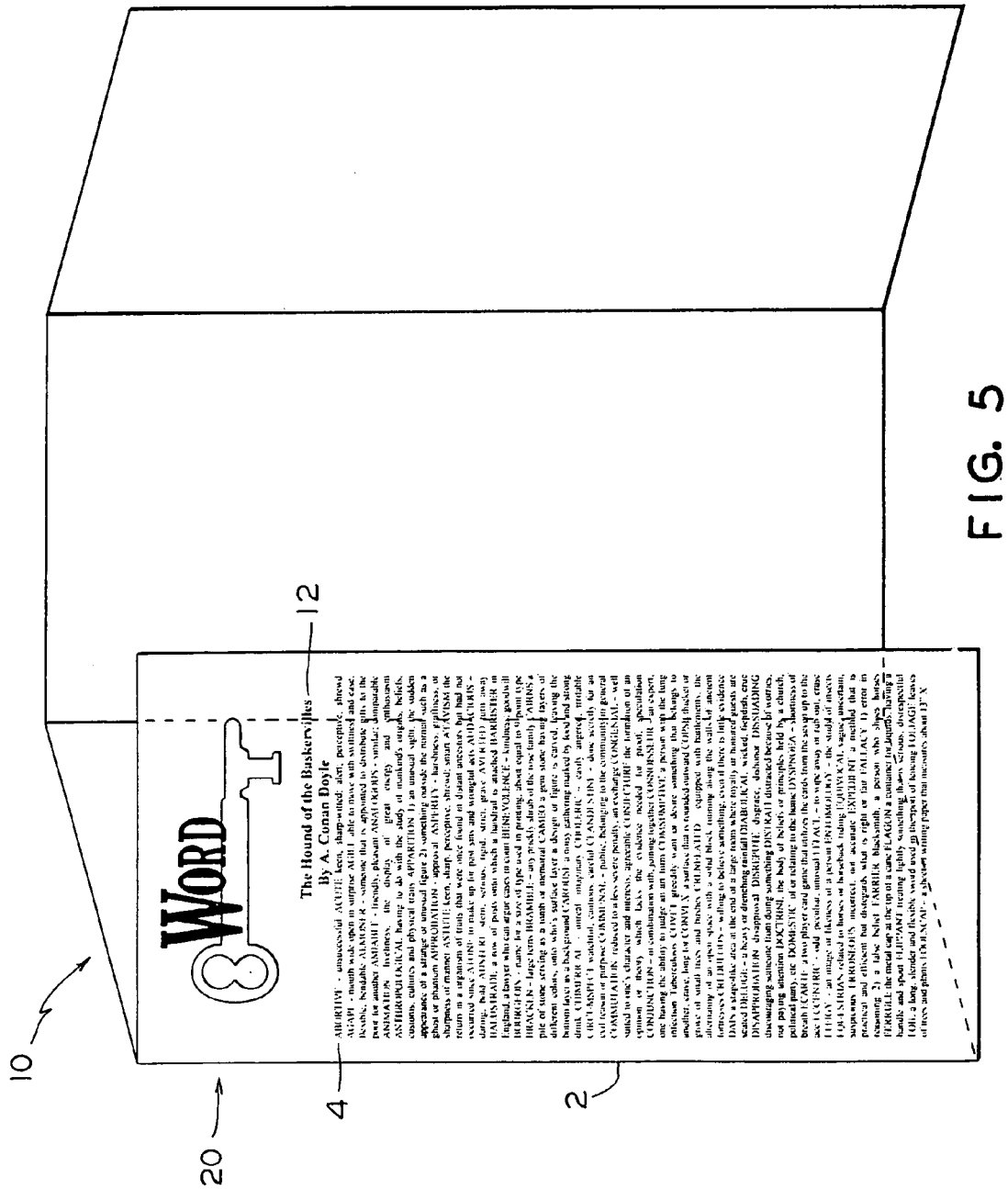
FIG. 5 is a partial perspective view of the apparatus in which the apparatus has three folds.

The word(s) 4 along with the definitions 6 are disposed continuously across the width of the substrate 2 till the first line is filled then it moves to the next line on the substrate 2. This continues until the first side of the substrate 2 is used up. Then if there are still more words 4 to be defined it continues on the second side of substrate 2 which is seen in FIG. 2. It is still another embodiment of the invention, as seen in FIGS. 3–5, that such substrate 2 can be designed to be folded in one, two or even three folds, if necessary, to preserve the bookmark quality while accommodating a large number of words 4 and definitions 6. The substrate should not be too wide so as to be in keeping with bookmarks.

The use of such apparatus 10 enables a reader of such predetermined book to simply glance down at the apparatus 10 when a difficult word 4 appears in the text and find a definition 6 for such word 4 without having to go to an outside source, such as a dictionary, or guess at the meaning of the word 4.

The substrate is made of one of plastic, cardboard, paper and various combinations thereof. In a presently preferred embodiment of the invention such substrate 2 would be made of paper and in an even more preferred embodiment such paper would be laminated. And in an even more preferred embodiment such substrate is paper laminated in plastic.

The configuration of the substrate 2 can encompass a variety of shapes. The substrate could be rectangular, oval, square or even a circle or a combination of shapes. However, it is presently preferred that the predetermined configuration of the substrate be rectangular. Further, it is also presently preferred that the predetermined size of such configuration be approximately, but not limited to, 4¼ by 8½ inches for use with a standard book. This size presents sufficient surface area so that a significant number of difficult or unusual words 4 can be defined, yet is small enough that it will easily fit as a bookmark in such book. It is within the embodiment of the invention that such substrate could also be creased so as to fold lengthwise so as to be more in keeping with the width of a bookmark when used as just a bookmark yet be readily opened so that the full width is available for viewing when the book is being read. In the event that the number of words to be defined cannot be accommodated on a 4¼ by 8½ inch substrate, then the necessary appropriate size substrate is used and creased so as to be folded 1, 2 or 3 times until the substrate is approximately 4¼ by 8½ inches when folded.

For paperback books (pocket books) such preferred size would be substantially about 3½ by 6 inches. Since such substrate 2 for use with paperback books must be smaller it is also an embodiment of the invention that such substrate be creased so as to be folded at least once to provide four surfaces with each substrate. As stated previously such substrate can also be folded in thirds or even with three folds to provide more surface area in the event that there are a large number of words 4 that require explanations. FIGS. 3, 4 and 5 show the substrate 2 as it would appear with one, two and three folds. Again it is important to maintain the bookmark character of the substrate as regard to width.

Similarly the predetermined size of the substrate 2 could be somewhat larger than 4¼ by 8½ inches when the apparatus 10 is to be used with a book with large size print. The larger size of the substrate 2 would accommodate the larger print words 4 and definitions 6 or could also accommodate larger numbers of words 4 and definitions 6.

In an alternate embodiment of the invention wherein the substrate 2 is plastic laminated paper, the plastic is further modified to be a magnifying plastic material. In yet another embodiment such plastic laminated paper is equipped with a magnifying plastic slide that can slide down the substrate so as to magnify the words 4 and definitions 6 for those persons that have difficulty reading normal print.

While a presently preferred embodiment and alternate embodiments of the present invention has been described in detail above, it should be understood that various other adaptations and/or modifications of the invention can be made by those persons who are particularly skilled in the art without departing from either the spirit of the invention or the scope of the appended claims.

I claim:

1. An apparatus for marking a page in a predetermined book, said apparatus comprising;
   (a) a substrate having a predetermined size and a predetermined configuration; and
   (b) selected words disposed adjacent definitions of said selected words on at least one side of said substrate, said selected words being words that are used in such predetermined book which would likely require a reader of such book to go to a dictionary to find a meaning for such words.

2. An apparatus, according to claim 1, wherein said substrate is made of one of plastic, cardboard, paper and various combinations thereof.

3. An apparatus, according to claim 2, wherein said substrate is paper.

4. An apparatus, according to claim 3, wherein said paper is laminated paper.

5. An apparatus, according to claim 3, wherein said paper is laminated in plastic.

6. An apparatus, according to claim 5, wherein said plastic laminated paper is further modified to include magnification in said plastic laminate.

7. An apparatus, according to claim 1, wherein said definitions of said words includes appropriate synonyms.

8. An apparatus, according to claim 1, wherein said predetermined configuration is generally rectangular.

9. An apparatus, according to claim 1, wherein said predetermined size is substantially about 4¼ by 8½ inches.

10. An apparatus, according to claim 1, wherein said selected words are printed in bold print.

11. An apparatus, according to claim 1, wherein said definitions of said selected words are printed in standard print.

12. An apparatus, according to claim 1, wherein said selected words are arranged in an alphabetical order.

13. An apparatus, according to claim 1, wherein said apparatus further includes a word key logo disposed on a first side of said at least one side of said substrate.

14. An apparatus, according to claim 13, wherein said apparatus further includes a title and an author of such predetermined book disposed beneath said word key logo.

15. An apparatus, according to claim 1, wherein said apparatus further includes a magnifying slide affixed to said substrate.

16. An apparatus, according to claim 1, wherein said apparatus further includes at least one crease to enable said substrate to be folded at least once so as to provide a plurality of surfaces.

17. An apparatus, according to claim 16, wherein said plurality of surfaces is four.

18. An apparatus, according to claim 16, wherein said plurality of surfaces is six.

19. An apparatus, according to claim 16, wherein said plurality of surfaces is eight.

20. An apparatus, according to claim 16, wherein said substrate after being folded at least once is substantially about 4¼ by 8½ inches.

* * * * *